United States Patent
Lee et al.

(10) Patent No.: US 9,854,395 B2
(45) Date of Patent: Dec. 26, 2017

(54) METHODS AND SYSTEMS FOR NOTIFYING USER OF DESTINATION BY ROUTE GUIDE

(71) Applicant: NAVER CORPORATION, Seongnam-Si, Gyeonggi-Do (KR)

(72) Inventors: Yoon Shick Lee, Seongnam-si (KR); Min Sik Park, Seongnam-si (KR); Min Oh Kim, Seongnam-si (KR)

(73) Assignee: Naver Corporation, Gyeonggi-Do (KR)

( * ) Notice: Subject to any disclaimer, the term of this patent is extended or adjusted under 35 U.S.C. 154(b) by 70 days.

(21) Appl. No.: 14/489,946

(22) Filed: Sep. 18, 2014

(65) Prior Publication Data

US 2015/0094955 A1 Apr. 2, 2015

(30) Foreign Application Priority Data

Sep. 27, 2013 (KR) .................. 10-2013-0115060

(51) Int. Cl.
| | |
|---|---|
| G08G 1/123 | (2006.01) |
| G01C 21/34 | (2006.01) |
| H04W 4/02 | (2009.01) |
| G01C 21/36 | (2006.01) |

(52) U.S. Cl.
CPC ........ *H04W 4/021* (2013.01); *G01C 21/3697* (2013.01)

(58) Field of Classification Search
USPC ................................. 701/400–541
See application file for complete search history.

(56) References Cited

U.S. PATENT DOCUMENTS

| | | | | |
|---|---|---|---|---|
| 6,721,654 B2* | 4/2004 | Akiyama | ........... | G01C 21/3697 340/988 |
| 7,260,473 B2* | 8/2007 | Abe | ........... | G08G 1/005 701/420 |
| 7,383,123 B2* | 6/2008 | Park | ........... | G01C 21/36 701/410 |
| 7,561,958 B2* | 7/2009 | Tomita | ........... | G01C 21/3679 701/423 |
| 7,933,395 B1* | 4/2011 | Bailly | ........... | G06F 3/04815 379/201.04 |

(Continued)

FOREIGN PATENT DOCUMENTS

| | | |
|---|---|---|
| JP | 2000-207577 | 7/2000 |
| JP | 2002-168637 | 6/2002 |

(Continued)

OTHER PUBLICATIONS

Korean Office Action issued in corresponding Korean patent application No. 10-2013-0115060, dated Oct. 15, 2014.

(Continued)

*Primary Examiner* — Bhavesh V Amin
(74) *Attorney, Agent, or Firm* — Harness, Dickey & Pierce (57) ABSTRACT

A method of providing destination information to a user through a location-based service includes: determining whether the user has approached a destination along a guided route for the user based on mapped location information for the user, the destination being designated by the user; and activating a visual notification function associated with the destination when the user is determined to have approached the destination.

19 Claims, 7 Drawing Sheets

(56) References Cited

U.S. PATENT DOCUMENTS

| | | | |
|---|---|---|---|
| 8,649,973 B2* | 2/2014 | Kawaguchi | G01C 21/3626 345/205 |
| 2002/0091793 A1* | 7/2002 | Sagie | G06F 17/3087 709/217 |
| 2003/0093216 A1* | 5/2003 | Akiyama | G01C 21/362 701/433 |
| 2004/0107048 A1* | 6/2004 | Yokota | G01C 21/343 701/431 |
| 2004/0243307 A1* | 12/2004 | Geelen | G01C 21/3635 701/469 |
| 2004/0249565 A1* | 12/2004 | Park | G01C 21/36 701/410 |
| 2005/0004754 A1* | 1/2005 | Hayes | G01C 21/30 701/533 |
| 2005/0021227 A1* | 1/2005 | Matsumoto | G01C 21/3415 701/431 |
| 2005/0096842 A1* | 5/2005 | Tashiro | G01C 21/3492 701/414 |
| 2005/0182564 A1* | 8/2005 | Kim | G01C 21/3644 701/468 |
| 2006/0052934 A1* | 3/2006 | Tomita | G01C 21/3682 701/533 |
| 2006/0075442 A1* | 4/2006 | Meadow | G06F 17/30241 725/91 |
| 2006/0129316 A1 | 6/2006 | Park | |
| 2006/0140448 A1* | 6/2006 | Fujii | G01C 21/20 382/104 |
| 2006/0156209 A1* | 7/2006 | Matsuura | G06Q 10/10 714/798 |
| 2006/0287815 A1* | 12/2006 | Gluck | G01C 21/3632 701/436 |
| 2007/0073478 A1* | 3/2007 | Funato | G01C 21/3679 701/423 |
| 2007/0106469 A1* | 5/2007 | Ishizaki | G01C 21/343 701/416 |
| 2007/0162942 A1* | 7/2007 | Hamynen | G06F 3/011 725/105 |
| 2007/0198182 A1* | 8/2007 | Singh | G01C 21/3647 701/431 |
| 2008/0040024 A1* | 2/2008 | Silva | G01C 21/3635 701/436 |
| 2008/0187181 A1* | 8/2008 | Meadow | G06K 9/32 382/113 |
| 2009/0119008 A1* | 5/2009 | Kobuya | G01C 21/36 701/439 |
| 2009/0177383 A1* | 7/2009 | Tertoolen | G01C 21/3682 701/532 |
| 2009/0254268 A1* | 10/2009 | Figueroa | G01C 21/3644 701/533 |
| 2009/0289937 A1* | 11/2009 | Flake | G06T 17/05 345/419 |
| 2010/0073201 A1* | 3/2010 | Holcomb | G08G 1/005 340/990 |
| 2010/0123737 A1* | 5/2010 | Williamson | G01C 21/3647 345/672 |
| 2010/0161658 A1* | 6/2010 | Hamynen | H04N 21/6131 707/770 |
| 2010/0215250 A1* | 8/2010 | Zhu | G06T 17/05 382/154 |
| 2010/0250581 A1* | 9/2010 | Chau | G06F 17/30265 707/769 |
| 2010/0257195 A1* | 10/2010 | Inoue | G01C 21/3602 707/769 |
| 2010/0293173 A1* | 11/2010 | Chapin | G06F 17/3087 707/759 |
| 2011/0106432 A1* | 5/2011 | Kawaguchi | G01C 21/3626 701/533 |
| 2011/0313653 A1 | 12/2011 | Lindner | |
| 2012/0059720 A1* | 3/2012 | Musabji | G01C 21/3638 705/14.58 |
| 2013/0325481 A1* | 12/2013 | van Os | G10L 21/00 704/275 |
| 2015/0241235 A1* | 8/2015 | Lobato Fregoso | G01C 21/36 701/423 |

FOREIGN PATENT DOCUMENTS

| | | |
|---|---|---|
| JP | 2003-254775 | 9/2003 |
| JP | 2004-048674 A | 2/2004 |
| JP | 2004219293 A | 8/2004 |
| JP | 2007206298 A | 8/2007 |
| JP | 2010-230551 | 10/2010 |
| KR | 10-0235240 | 12/1999 |
| KR | 1020060066859 A | 6/2006 |

OTHER PUBLICATIONS

Japanese Office Action dated Aug. 25, 2015, issued in Japanese Patent Application 2014-186719.

Japanese Office Action issued in Japanese Patent Application No. 2014-186719, dated Apr. 12, 2016.

* cited by examiner

METHODS AND SYSTEMS FOR NOTIFYING USER OF DESTINATION BY ROUTE GUIDE

CROSS-REFERENCE TO RELATED APPLICATION

This application claims priority under 35 U.S.C. §119 to Korean Patent Application No. 10-2013-0115060, filed on Sep. 27, 2013, the entire contents of which are incorporated herein by reference for all purposes as if fully set forth herein.

BACKGROUND

Field

Example embodiments relate to methods and/or apparatuses for more accurately notifying a user of a location of a destination when the user arrives at or near the destination using a location-based service.

Description of Conventional Art

Recently, with the development of global positioning system (GPS) technology and geographical information system (GIS) technology, a user may verify his/her location and peripheral information without restrictions with regard to time and/or occasion. A user may also be provided with travel route information associated with a destination through a variety of location-based services, such as a location verification service, a route find service, a route guide service, a local search service, etc.

A route guide service refers to a service that recognizes a current location of a terminal, such as a mobile terminal (e.g., a navigation terminal, a smartphone, etc.), identifies the recognized current location of the terminal on a map, and provides a travel route to a destination as well as additional information to a user.

A route find service refers to a service that notifies a user of a route based on departure, passage, and destination input from the user. A route find service may guide the user along a route by continuously updating a current location of the user on a map so long as the user allows use of his/her location information.

In an outdoor environment, GPS may be used to identify a current location of a user. Alternatively, or in conjunction with GPS, a current location of a user may be identified by: calculating a current location using a base station signal of a mobile communications network; calculating a current location using a WiFi base station signal; and/or requesting and receiving location information and/or a current location of a terminal from a location-based server.

In an indoor environment, a current location of a user may be identified using access point (AP) information and/or an indoor positioning system (IPS).

A conventional location-based service may guide a user along a route to a location near a destination designated by the user. However, conventional location-based services may not accurately notify the user of the actual location of the destination upon arrival near the destination. Rather, this must be done using a separate method.

In one conventional example, a user is provided with a destination arrival alarm when the user approaches a base station area of a mobile communications network corresponding to a destination set by the user. In this example, however, the location-based service terminates the guidance after outputting only a simple message such as, "you just arrived around your destination" when the user arrives near the destination. Accordingly, when it is difficult for the user to immediately determine or identify the actual location of the destination based on only location (e.g., GPS) information (e.g., when a user is located around a station, a market, a roadside of multiple lanes, an alley, a trail, etc.) the user may wander around the destination delaying arrival.

SUMMARY

Some example embodiments provide systems capable of more accurately notifying a user of a location of a destination using information associated with the destination when the user arrives near the destination using a location-based service. Some example embodiments also provide methods of more accurately notifying a user of a location of a destination using information associated with the destination when the user arrives near the destination using a location-based service.

According to example embodiments, it is possible to enhance quality and/or satisfaction of a route guide service by more accurately notifying a user of a destination using information associated with the destination when the user arrives near the destination using a location-based service.

Additional features of the example embodiments will be set forth in the description which follows, and in part will be apparent from the description, or may be learned by practice of example embodiments.

At least one example embodiment provides a method of providing destination information to a user through a location-based service. According to at least this example embodiment, the method includes: determining whether the user is approaching a destination designated by the user when guiding the user along a route using a map screen on which location information for the user is mapped; and activating a visual notification function associated with the destination when the user is determined to be approaching the destination.

At least one other example embodiment provides a method of providing destination information to a user through a location-based service. According to at least this example embodiment, the method includes: determining whether the user is approaching a destination along a guided route for the user based on mapped location information for the user, the destination being designated by the user; and activating a visual notification function associated with the destination when the user is determined to be approaching the destination.

The route may be a travel route traversed by the user at least one of by walking, using a vehicle, using public transportation, and using a bicycle. The destination may be an intermediate destination along the route.

The activating the visual notification function associated with the destination may include: displaying, on a street view screen, an actual street view around a current location of the user; highlighting an object corresponding to the destination on the street view screen; and displaying the highlighted object on the street view screen.

According to at least some example embodiments, the highlighting the object may include: highlighting the object corresponding to the destination on the street view screen using a color or figure such that the highlighted object is distinguished from other objects on the street view screen.

According to at least some other example embodiments, the highlighting the object may include: processing an edge of the object corresponding to the destination to be bold on the street view screen.

The object may correspond to one of an individual building, a location within a building complex, a street, a sidewalk, and a trail.

According to at least some example embodiments, the activating the visual notification function associated with the destination may include: displaying, on a street view screen, an actual street view around a current location of the user; and displaying, on the street view screen, an instruction indicator on an object corresponding to the destination.

According to at least some other example embodiments, the activating the visual notification function associated with the destination may include: displaying, on a street view screen, an actual street view around a current location of the user; and displaying, on the street view screen, at least one of text describing the destination and an instruction indicator on an object corresponding to the destination.

According to at least some example embodiments, the activating the visual notification function associated with the destination may include: displaying an enlarged photo of the destination.

According to at least some example embodiments, the activating the visual notification function associated with the destination may include: displaying at least one of an actual photo of the destination and a three-dimensional (3D) map, the 3D map being generated using a vector rendering method.

According to at least some example embodiments, the activating the visual notification function associated with the destination may include: activating the visual notification function at a point in time at which route guidance for the user to the destination is completed.

At least one other example embodiment provides a system for providing destination information to a user through a location-based service. According to at least this example embodiment, the system includes: a determiner configured to determine whether the user is approaching a destination designated by the user when guiding the user along a route using a map screen on which location information for the user is mapped; and a processing unit configured to activate a visual notification function associated with the destination when the user is determined to be approaching the destination.

According to at least one other example embodiment, a system for providing destination information to a user through a location-based service, includes: a determiner configured to determine whether the user is approaching a destination along a guided route for the user based on mapped location information for the user, the destination being designated by the user, and a processing unit configured to activate a visual notification function associated with the destination when the user is determined to be approaching the destination.

The route may be a travel route traversed by the user at least one of by walking, using a vehicle, using public transportation, and using a bicycle. The destination may be an intermediate destination along the route.

The processing unit may be further configured to: display, on a street view screen, an actual street view around a current location of the user; highlight an object corresponding to the destination on the street view screen; and display the highlighted object on the street view screen.

The processing unit may be further configured to display an enlarged photo of the destination.

The processing unit may be further configured to display at least one of an actual photo of the destination and a three-dimensional (3D) map, the 3D map being generated using a vector rendering method.

The processing unit may be configured to activate the visual notification function at a point in time at which route guidance for the user to the destination is completed.

At least one other example embodiment provides a non-transitory computer-readable medium storing instructions to control a computer or processor-based system to perform a method for providing destination information to a user through a location-based service. According to at least this example embodiment, the method includes: determining whether the user is approaching a destination designated by the user when guiding the user along a route using a map screen on which location information for the user is mapped; and activating a visual notification function associated with the destination when the user is determined to be approaching the destination.

At least one other example embodiment provides a non-transitory computer-readable medium storing instructions to control a computer or processor-based system to perform a method for providing destination information to a user through a location-based service. According to at least this example embodiment, the method includes: determining whether the user is approaching a destination along a guided route for the user based on mapped location information for the user, the destination being designated by the user; and activating a visual notification function associated with the destination when the user is determined to be approaching the destination.

At least one other example embodiment provides a file distribution system for distributing a file of an application installed at a user terminal to provide destination information for the user terminal through a location-based service. According to at least this example embodiment, the file distribution system includes: a file transmitter configured to transmit the file in response to a request from the user terminal. The application includes: a first module configured to control the user terminal to determine whether the user is approaching a destination designated by the user when guiding the user along a route using a map screen on which location information of the user is mapped; and a second module configured to control the user terminal to activate a visual notification function associated with the destination when the user is determined to be approaching the destination.

Still at least one other example embodiment provides a file distribution system for distributing a file of an application installed at a user terminal to provide destination information for the user terminal through a location-based service. According to at least this example embodiment, the file distribution system includes: a file transmitter configured to transmit the file in response to a request from the user terminal. The application includes: a first module configured to control the user terminal to determine whether the user is approaching a destination along a guided route for the user based on mapped location information for the user, the destination being designated by the user, and a second module configured to control the user terminal to activate a visual notification function associated with the destination when the user is determined to be approaching the destination.

It is to be understood that both the foregoing general description and the following detailed description are explanatory and are intended to provide further explanation of the example embodiments as claimed.

BRIEF DESCRIPTION OF THE DRAWINGS

The accompanying drawings, which are included to provide a further understanding of example embodiments and are incorporated in and constitute a part of this specification, illustrate example embodiments, and together with the description serve to explain the principles of example embodiments.

DETAILED DESCRIPTION OF EXAMPLE EMBODIMENTS

Example embodiments will now be described more fully with reference to the accompanying drawings in which some example embodiments are shown. Example embodiments may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

Although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, unless the context accurately indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements not the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Specific details are provided in the following description to provide a thorough understanding of example embodiments. However, it will be understood by one of ordinary skill in the art that example embodiments may be practiced without these specific details. For example, systems, apparatuses and/or devices may be shown in block diagrams so as not to obscure the example embodiments in unnecessary detail. In other instances, well-known processes, structures and techniques may be shown without unnecessary detail in order to avoid obscuring example embodiments.

In the following description, example embodiments may be described with reference to acts and symbolic representations of operations (e.g., in the form of flow charts, flow diagrams, data or signal flow diagrams, structure diagrams, block diagrams, etc.) that may be implemented as program modules or functional processes include routines, programs, objects, components, data structures, etc., that perform particular tasks or implement particular abstract data types, and may be implemented using existing hardware at, for example, existing mobile devices, systems, servers, etc. Such existing hardware may include one or more Central Processing Units (CPUs), system-on-chip (SOC) devices, digital signal processors (DSPs), application-specific-integrated-circuits, field programmable gate arrays (FPGAs), controllers, arithmetic logic units, digital signal processors, microcomputers, programmable logic units, microprocessors, or any other device capable of responding to and executing instructions in a defined manner.

Although a flow chart may describe the operations as a sequential process, many of the operations may be performed in parallel, concurrently or simultaneously. In addition, the order of the operations may be re-arranged. Further, in some alternative implementations, the functions/acts discussed herein may occur out of the order noted in the figures. For example, two figures shown in succession may in fact be executed substantially concurrently or simultaneously, or may be executed in the reverse order, depending upon the functionality/acts involved.

A process may be terminated when its operations are completed, but may also have additional steps not included in the drawings. A process may correspond to a method, function, procedure, subroutine, subprogram, etc. When a process corresponds to a function, its termination may correspond to a return of the function to the calling function or the main function.

As discussed herein, the term "storage medium", "tangible computer-readable storage medium", "computer-readable storage medium" or "non-transitory computer-readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as the computer-readable storage medium discussed herein. When implemented in software, a processor or processors may perform the one or more necessary tasks.

Software may include a computer program, one or more pieces of code, one or more code segments, instruction(s), or some combination thereof, for independently or collectively instructing or configuring a processing device to operate as desired. Software and data may be embodied permanently or temporarily in any type of machine, component, physical or virtual equipment, or computer-readable storage medium or device. Software also may be distributed over network coupled computer systems so that the software is stored and executed in a distributed fashion. In particular, the software and data may be stored by one or more computer readable recording mediums.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As discussed herein, example embodiments and/or one or more components thereof (e.g., components of mobile devices, destination information providing systems, systems to more accurately notify users of destination locations, etc.) may be hardware, firmware, hardware executing software or any combination thereof. In this regard, example embodiments may be described as circuits, units, devices, etc. When example embodiments and/or one or more components thereof are hardware, such hardware may include one or more Central Processing circuits (CPUs), system-on-chips (SOCs), digital signal processors (DSPs), application-specific-integrated-circuits (ASICs), field programmable gate arrays (FPGAs), controllers, arithmetic logic units, digital signal processors, microcomputers, programmable logic units, microprocessors, computers, or the like configured as special purpose machines to perform the functions described herein. CPUs, SOCs, DSPs, ASICs, FPGAs, etc. may sometimes generally be referred to as processors and/or microprocessors.

A processing device (e.g., at a mobile device and/or destination information providing system) may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

Hereinafter, example embodiments will be described with reference to the accompanying drawings.

One or more example embodiments relate to technology for more accurately notifying a user of a location of a destination using information associated with the destination when the user arrives near or at the destination using a location-based service. One or more example embodiments may be applied to a variety of location-based services, such as a location verification service, a route find service, route guide service, a local search service associated with global positioning system (GPS) technology and/or geographical information system (GIS), etc. In a more specific example, one or more example embodiments may be applied to a personal navigation system (PNS) corresponding to a pedestrian navigation service as well as a car navigation system (CNS) corresponding to a car navigation service.

Figure 1:
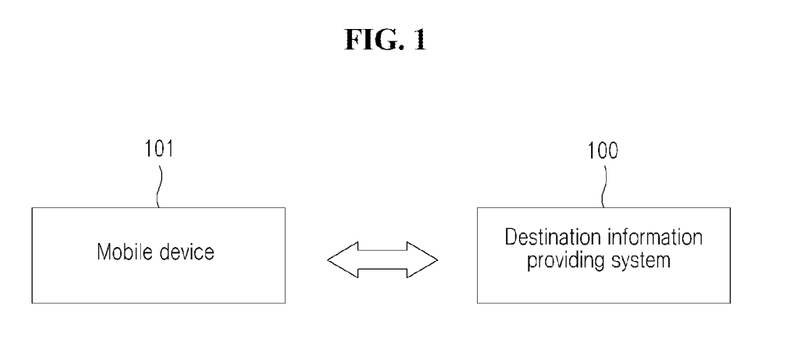
FIG. 1 illustrates a relationship between a mobile device and a destination information providing system according to example embodiments.

FIG. 1 illustrates an example relationship between a mobile device and a destination information providing system, according to an example embodiment.

Referring to FIG. 1, a mobile device 101 and a destination information providing system 100 are shown. Here, the arrow indicator indicates that data may be transmitted and received between the mobile device 101 and the destination information providing system 100 over a network (e.g., wired and/or wireless network).

According to one or more example embodiments, the destination information providing system 100 may be a physical computer hardware system configured to provide services for mobile devices (e.g., mobile device 101) connected to a network, such as the Internet, a Wide Area Network (WAN), a personal area network (PAN), local area network (LAN), campus area network (CAN), metropolitan area network (MAN), a virtual local area network, and/or any other like network capable of physically or logically connecting computers or other devices (not shown). In one or more example embodiments, the destination information providing system 100 may be a server or other like network element that employs one or more connection-oriented protocols such as Session Initiation Protocol (SIP), Hyper-Text-Transfer-Protocol (HTTP), and Transport Control Protocol/Internet Protocol (TCP/IP), and includes network devices that use connectionless protocols such as User Datagram Protocol (UDP), Internet Packet Exchange (IPX), and the like. Destination information providing system 100 may be configured to establish, manage, and terminate communications sessions, for example between the destination information providing system 100 and the mobile device 101. Destination information providing system 100 may also be configured to establish, manage, and terminate communications sessions with two or more client devices.

In a more specific example, the destination information providing system 100 may serve as a platform configured to provide a location-based service to the mobile device 101 corresponding to a client or user. For example, the destination information providing system 100 may provide a location-based service in a mobile web or mobile application ("app") environment through a service platform based on a mobile search. In this example, the destination information providing system 100 may provide a function of more accurately notifying a user of a location of a destination when the user arrives near the location of the destination using the location-based service.

Still referring to FIG. 1, according to at least this example embodiment, the mobile device 101 may be any hardware computing device capable of providing communications services via a cellular network, computer network, and/or other like communications network. In various example embodiments, the mobile device 101 may be capable of communicating with a server (e.g., destination information providing system 100), such that the mobile device 101 is able to receive services from the server. In one example, the mobile device 101 may include memory, one or more processors, and a transceiver. The mobile device 101 may be configured to send/receive data to/from network devices, such as routers, switches, or other like network devices. The mobile device 101 may be designed to sequentially and automatically carry out a sequence of arithmetic or logical operations; equipped to record/store digital data on a machine readable medium; and transmit and receive digital data via one or more network devices. The mobile device 101 may include a wireless transceiver configured to operate in accordance with wireless communications standards (e.g., $3^{rd}$ Generation Partnership Project (3GPP), etc.).

In a more specific example, the mobile device 101 may be any type of terminal device capable of accessing the destination information providing system 100 through a mobile web or a mobile app. For example, the mobile device 101 may be any hardware computing device having portability or mobility, such as: a smart phone; a tablet computer; a laptop computer; a digital multimedia broadcasting (DMB) terminal; a navigation device or terminal; an Internet-enabled video camera; an Internet-enabled digital photo camera; an MP3 player: a portable media player (PMP); and/or any logical device capable of capturing/recording, storing, and/or transferring data via a communications network. According to at least this example, the mobile device 101 may perform the overall service operation, including service screen configuration, data input, data transmission and reception, data storage according to control of the mobile web or the mobile app, etc.

As mentioned above, in some cases, although a user may arrive near a destination using the location-based service provided through the mobile device 101, the user may not immediately find or identify the actual location of the destination such as at a location near a station, a market, a roadside of multiple lanes, a forked sidewall, or a trail. In this case, a method and/or function of more accurately notifying the actual destination may be helpful.

A method of more accurately notifying a user of a location of a destination within a location-based service, according to example embodiments, may be provided to a user that is to travel, for example, by walking, running, using a vehicle, public transportation (e.g., a subway, a bus, etc.), a bicycle, etc.

Herein, the route guide or route guidance of the location-based service may provide guiding or route guidance information (e.g., directions) for a travel route using at least one of vehicles, public transportation, bicycles, walking, etc. with respect to a destination designated by the user. The route guide may include a case in which the user travels using a single method of travel, and a case in which the user travels through at least two methods of travel (e.g., "walk+public transportation", "bicycle+walk", etc.). Also, the route guide may inclusively provide guidance along a travel route with respect to an indoor geography (e.g., within a building or other structure) based on an IPS in addition to providing guidance along a travel route with respect to an outdoor geography.

As discussed herein, the term "destination" may refer to a final destination, but may also inclusively refer to an intermediate destination, such as a passage or route segment through which the user passes before arriving at the final destination. Accordingly, one or more example embodiments may provide more accurate notification of a corresponding point with respect to the passage or route segment, as well as the final destination using the same or substantially the same method.

Figure 2:
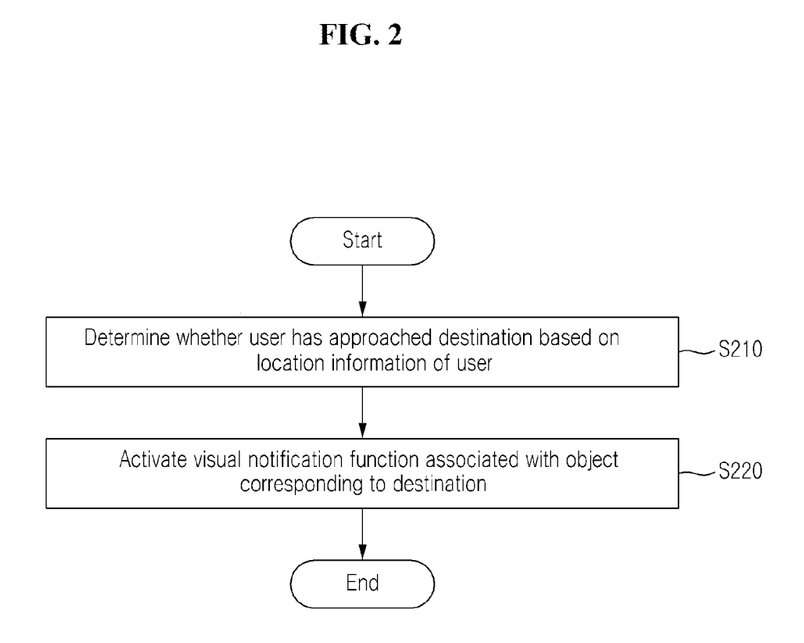
FIG. 2 is a flowchart illustrating a method of providing destination information to more accurately notify a user of a destination location, according to example embodiments.

FIG. 2 is a flowchart illustrating a method of providing destination information to more accurately notify a user of a location of a destination, according to an example embodiment. Operations of the destination information providing method according to at least this example embodiment will be described as being performed by a destination information providing system, such as that described with reference to FIGS. 1 and 8.

Referring to FIG. 2, in operation S210, the destination information providing system 100 determines whether a user has approached (or is approaching) a destination designated by the user when guiding the user along a route using a map screen on which location information of the user is mapped. Here, when guiding the user along a route using a location-based service through a mobile device using the map screen on which location information of the user (e.g., a current location of the mobile device) is mapped, the destination information providing system 100 may determine whether the user has arrived near the destination.

When the user is determined to have approached the destination, the destination information providing system 100 activates a visual notification function associated with the destination in operation S220.

In the example embodiment shown in FIG. 2, the destination information providing system 100 may provide the user with a visual notification function including peripheral image information such that the user is able to more accurately recognize the destination as well as the actual location of the destination. In one example, the peripheral image information may include: a street view and/or a photo of a current location of the mobile device and/or a map. In more detail, for example, the destination information providing system 100 may activate the visual notification function at a point in time at which guidance for a passage or segment of the route to an intermediate destination along the route is gradually completed, and/or at a point in time at which the guidance along the route is completed by approaching a final destination.

As an example, the destination information providing system 100 may provide a street view screen on which an actual street view around a current location of the user is displayed, and then may highlight and display an object corresponding to the destination on the street view screen. In another example, the destination information providing system 100 may provide an indoor view screen in which an actual indoor view is displayed in the case of an indoor environment, and then may highlight and display an object corresponding to the destination on the indoor view screen.

Figure 3:
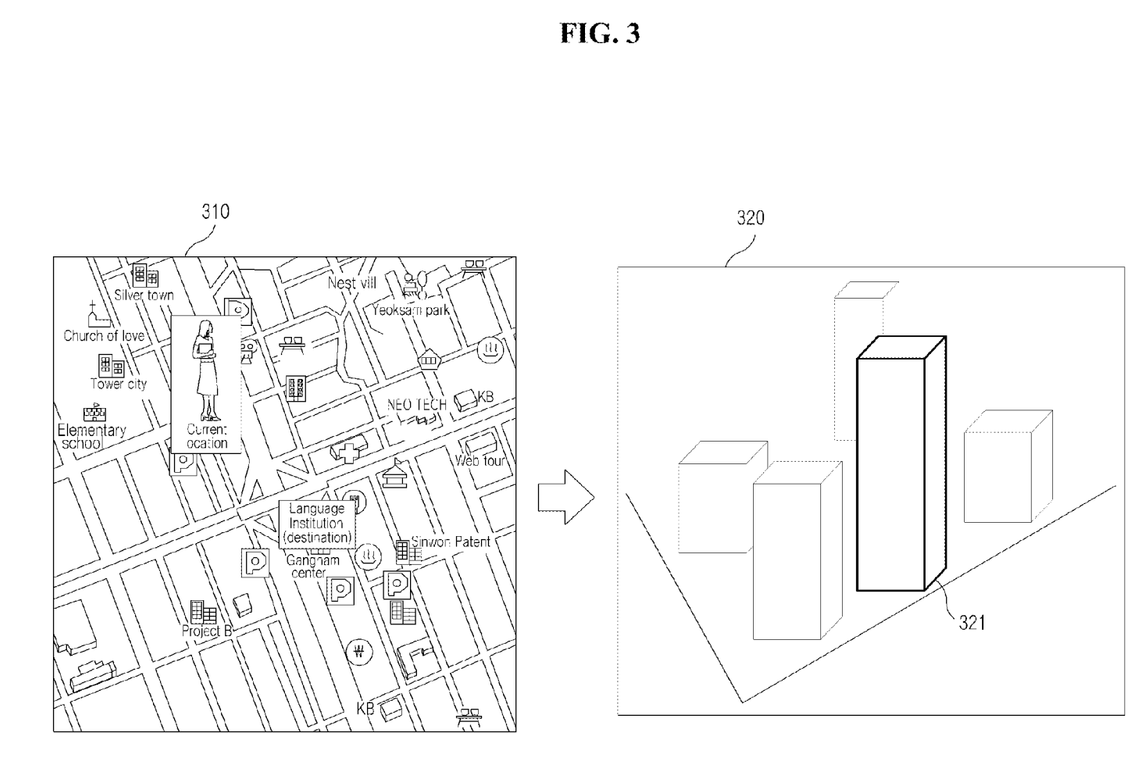
FIGS. 3 through 7 illustrate examples of visual notifications more accurately identifying a user of a destination location, according to example embodiments.

Referring to FIG. 3, when a user arrives near a destination on a guided travel route to the destination using a map screen 310 on which location information of the user is mapped, the destination information providing system 100 may highlight the destination using, for example, a color, a figure, text, etc., and may display the highlighted destination such that the destination is distinguished from the remaining portion (e.g., peripheral facility) on a street view screen 320. According to one or more example embodiments, the destination information providing system 100 may display the street view screen 320 by switching from the map screen 310 to the street view screen 320, or displaying the street view screen 320 together with the map screen 310 using a split screen effect. The term "object" used herein may refer to any type of points of interests (POIs) that may be designated as a destination, such as an individual building, a given (or alternatively desired or predetermined) location within a building complex, a road, a sidewalk, a trail, geographical coordinates in the form of longitude and latitude, etc.

Figure 4:
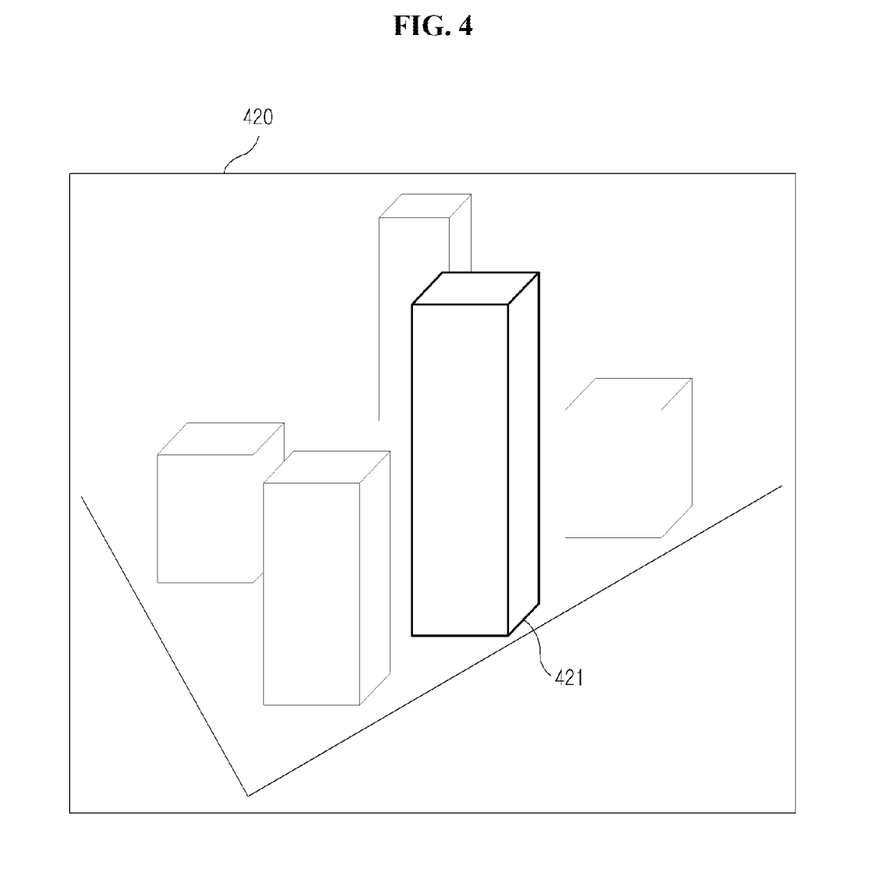
Figure 5:
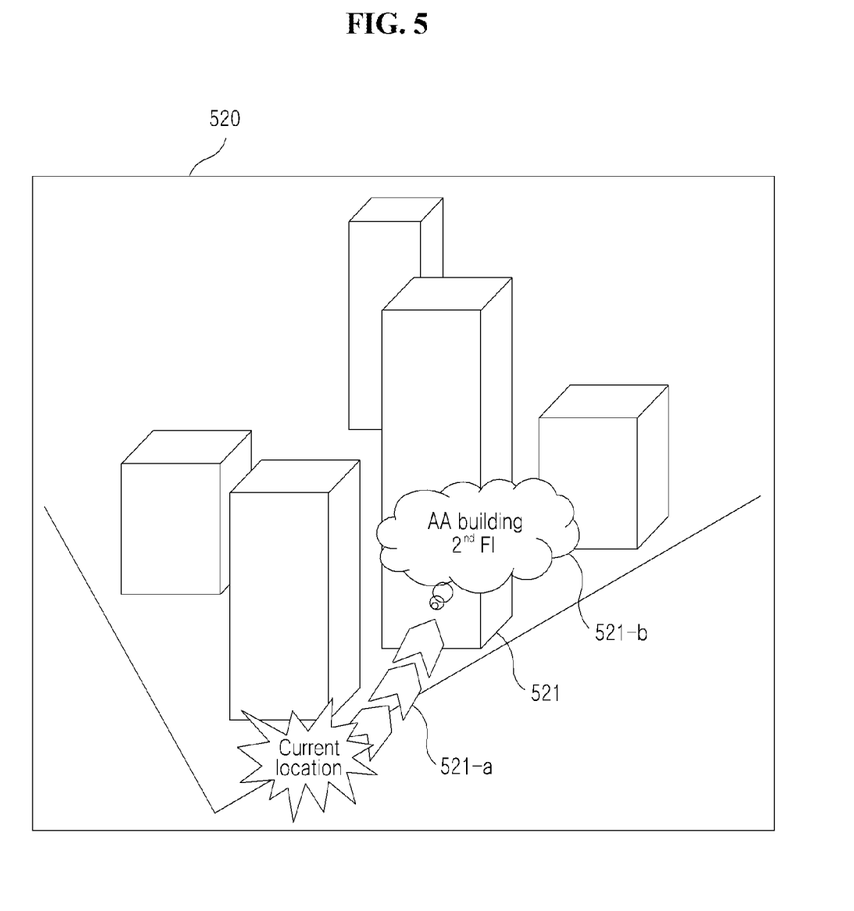

As an example, a destination notification function using a street view may be configured using: 1) a method of processing an edge of the object 321 corresponding to a destination to be bold, and displaying the processed object 321 to be distinguished from other portions of (e.g., peripheral facility on) the street view screen 320 as illustrated in FIG. 3; 2) a method of displaying an object 421 corresponding to a destination using a different color or figure to be distinguished from other portions of (e.g., peripheral facility on) a street view screen 420 as illustrated in FIG. 4; and/or 3) a method of displaying an instruction indicator (e.g., an arrow indicator) 521-*a* indicating (e.g., directly indicating) an object 521 corresponding to the destination, or indicating a direction from a current location of a user towards the destination, or a direction towards an entrance of a parking lot on a street view screen 520, or a method of displaying text (e.g., a name and/or a point of interest (POI)) 521-*b* describing the destination and an instruction indicator 521-*a* corresponding to the destination as illustrated in FIG. 5.

Figure 6:
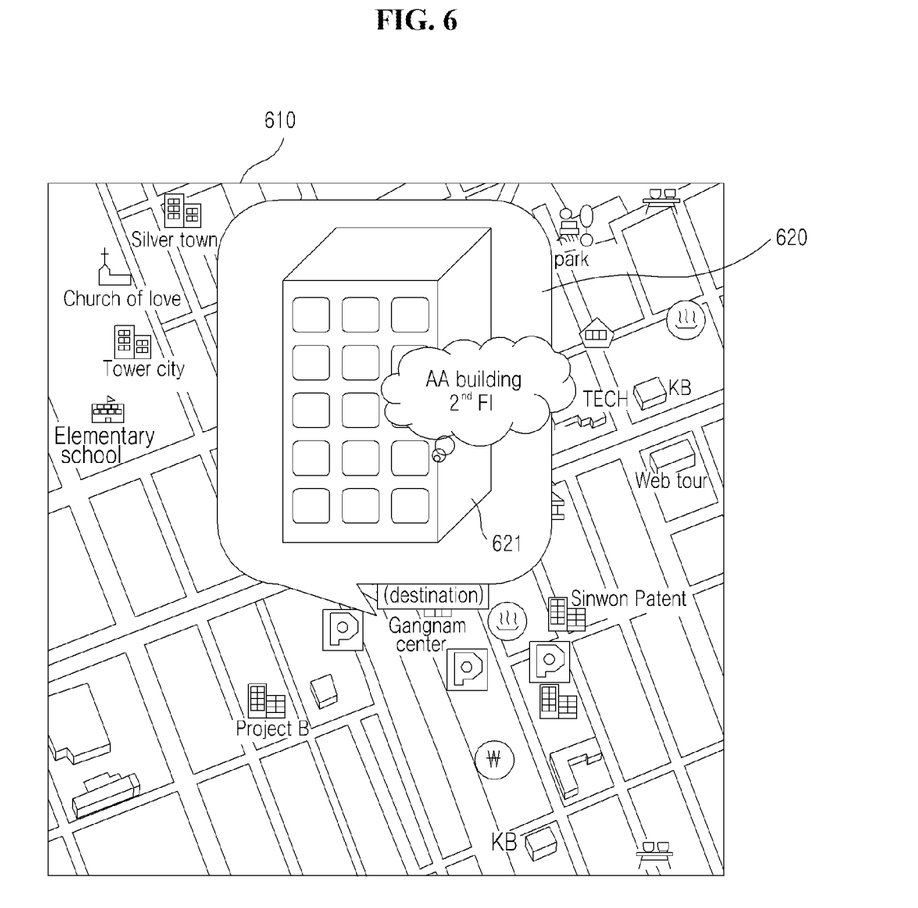

As another example, the destination information providing system 100 may display an enlarged photo of a destination when a user arrives near the location of the destination. For example, referring to FIG. 6, the destination information providing system 100 may display a popup screen 620, on which a photo of an object 621 corresponding to a destination is enlarged, as an overlay on a map screen 610.

Figure 7:
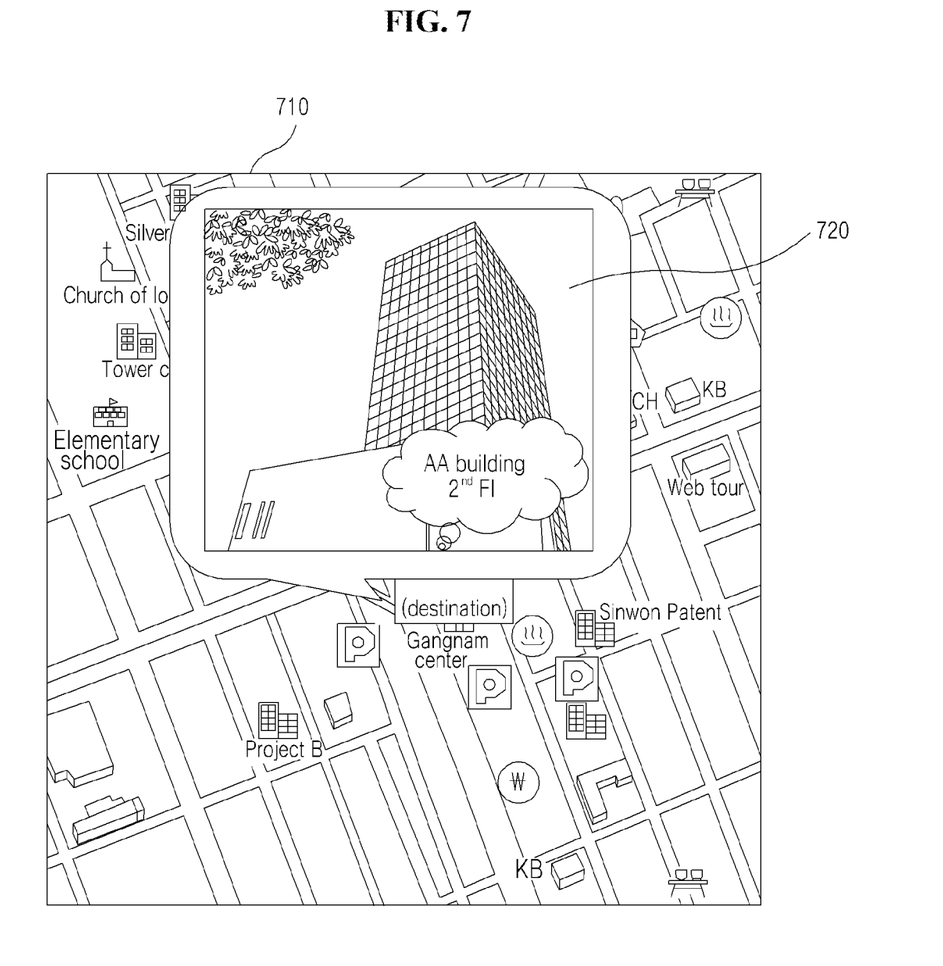

As yet another example, the destination information providing system 100 may more accurately designate and display a corresponding destination using a three-dimensional (3D) map of a location around the destination when a user arrives near the destination. In this example, the 3D map may include a map configured using one or more real (e.g., satellite) images and/or a 3D map configured using one or more vector rendering methods. When a map screen for a route guide is a two-dimensional (2D) map, a 3D map may be provided in association with surroundings of the destination so that the user may more intuitively recognize and identify the destination. Referring to FIG. 7, for example, the destination information providing system 100 may display a popup screen 720, on which one or more real images of a destination is/are displayed, as an overlay on a map screen 710.

The aforementioned destination information providing methods, devices, systems and/or computer-readable storage mediums, according to one or more example embodiments, may provide visual notification functionality about destinations so that a user may more accurately recognize and/or identify the destination when the user approaches the location of the destination using a location-based service.

The aforementioned destination information providing methods, devices, systems and/or computer-readable storage mediums, according to one or more example embodiments, may be applied to any and all location-based services (e.g., GPS devices, mobile terminals, tablet computers, etc.). Also, the destination notification function may refer to methods of recognizing an object using image information and a map. Accordingly, when using a destination as a single point of continuous actions, the destination notification function may be used to, for example, transmit a user's location, share and/or record a point in the case of leisure activities such as trekking and/or geo-caching.

As mentioned above, methods according to one or more example embodiments may be performed by, or implemented as, a variety of computer systems and may be recorded in non-transitory computer-readable media in a program instruction form. For example, example embodiments may include non-transitory computer-readable media storing one or more programs including processor-executable instructions that, when executed, cause the processor to execute a method including: determining whether a user has approached a destination designated by the user when guiding the user along a route using a map screen on which location information of the user is mapped; and activating a visual notification function for the destination when the user is determined to have approached the destination.

A program according to some example embodiments may include a personal computer (PC)-based program or a mobile application ("app") for a mobile terminal. An app for a mobile search may be configured in an independently operating program form or an in-app form of a given (or alternatively, desired or predetermined) application to thereby be operable on the given (or alternatively, desired or predetermined) application.

Destination information providing methods according to one or more example embodiments may be performed in such a manner that a mobile app associated with a server system (e.g., a location-based service server) controls a user terminal. For example, the applications may include one or more modules configured to control the user terminal to perform operations included in the aforementioned destination information providing methods. In one example, the application may include: a module (e.g., determination module) configured to control the user terminal to determine whether a user has approached a destination designated by the user when guiding the user along a route using a map screen on which location information of the user is mapped; and a module (e.g., activation module) configured to control the user terminal to activate a visual notification function associated with the destination when the user is determined to have approached the destination. Also, the application may be installed on the user terminal through a file provided from a file distribution system. For example, the file distribution system may include a file transmitter (not shown) configured to transmit the file in response to a request of the user terminal.

Figure 8:
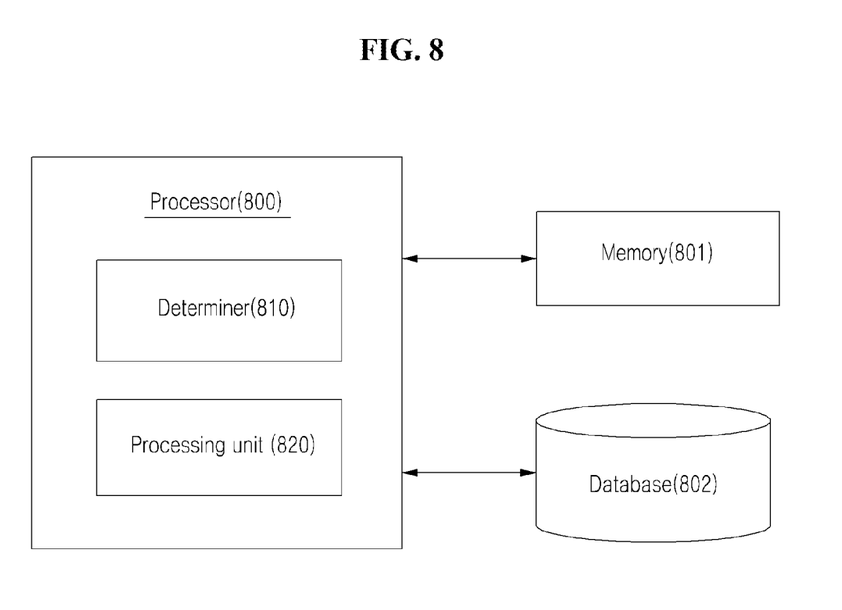
FIG. 8 is a block diagram illustrating a destination information providing system to more accurately notify a user of a destination location, according to example embodiments.

FIG. 8 is a block diagram illustrating a destination information providing system to more accurately notify a user of a destination location, according to example embodiments.

Referring to FIG. 8, the destination information providing system includes: a processor 800; a memory 801; and a database 802. The processor 800 includes a determiner 810 and a processing unit 820.

The memory 801 may store a program including processor-executable instructions that, when executed, cause the processor to provide a visual notification function associated with a destination so that a user may more accurately identify and/or recognize a destination when guided along a route using a map screen on which location information of the user is mapped. Operations performed by the destination information providing system described above with reference to FIGS. 1 through 7 may be executed in accordance with the program stored in the memory 801. According to at least some example embodiments, the memory 801 may be a hard disc, a solid state disk (SSD), a secure digital (SD) card, or other storage media.

The database 802 may store and maintain information (e.g., all or substantially all information) required to provide a location-based service, and information (e.g., all information) required to provide a visual notification function associated with a destination when a user approaches the destination using the location-based service.

The processor 800 refers to a device configured to perform processing in response to instructions of the program stored in the memory 801. The processor 800 may include a microprocessor, for example, a central processing unit (CPU). Hereinafter, a detailed configuration of the processor 800 will be described.

Still referring to FIG. 8, the determiner 810 determines whether a user has approached a destination designated by the user when guiding the user along a route using a map screen on which location information of the user is mapped. Here, when guiding the user along a route for the user using a location-based service through a mobile device using the map screen on which location information of the user (e.g., a current location of the mobile device) is mapped, the determiner 810 determines whether the user has arrived near the destination.

When the user is determined to have approached or arrived near the destination, the processing unit 820 activates a visual notification function for (or associated with) the destination. Here, the processing unit 820 enables the user to more accurately identify and/or recognize the destination through the visual notification function using peripheral image information (e.g., a street view and a photo) of a current location of the mobile device and a map. In one example, the processing unit 820 activates the visual notification function at a point in time at which route guidance for a passage or segment of the route corresponding to an intermediate destination is gradually completed, and/or at a point in time at which the route guidance is completed by approaching a final destination. As an example, the processing unit 820 may provide a street view screen on which an actual street view around a current location of the user is displayed, and then may highlight and display an object corresponding to the destination on the street view screen. In another example, the processing unit 820 may provide an indoor view screen on which an actual indoor view is displayed in the case of an indoor environment, and then may highlight and display an object corresponding to the destination on the indoor view screen. When a user arrives near a destination while guided along a travel route to the destination using a map screen on which location information of the user is mapped, the processing unit 820 may highlight the destination according to a visualization method using, for example, a color, a figure, and/or text, and may display the highlighted destination to be distinguished from other portions of the map screen (e.g., peripheral facility) using a street view screen. As an example, the processing unit 820 may provide a visual notification function for a corresponding destination using: (1) a method of processing an edge of an object corresponding to a destination to be bold, and displaying the processed object to be distinguished from other portions of the map screen (e.g., peripheral facility) on a street view screen; (2) a method of displaying an object corresponding to a destination using a different color and/or figure to be distinguished from other portions of the map screen (e.g., peripheral facility); (3) a method of displaying an instruction indicator on an object corresponding to a destination; and/or (4) a method of displaying text associated with describing a destination and/or an instruction indicator on an object corresponding to a destination. In another example, the processing unit 820 may provide a visual notification function for a corresponding destination using a method of displaying an enlarged photo of the destination, a method of displaying a real (e.g., satellite) photo of the destination, and/or a 3D map configured using one or more vector rendering methods.

Accordingly, destination information providing systems, according to example embodiments, may enable more accurate notification of a destination to a user when the user arrives near the destination using a location-based service.

Although FIG. 8 is discussed with regard to the processor 800 as part of the destination information providing system 100, it should be understood that the determiner 810 and processing unit 820 may be located at the mobile device 101 and operate in the same or substantially the same manner.

Moreover, although the example embodiment shown in FIG. 2 is discussed herein as being performed at the destination information providing system 100, it should be understood that the mobile device 101 may perform operations S210 and S220.

Referring back to FIG. 2, for example, in this example embodiment, in operation S210, the mobile device 101 determines whether a user has approached (or is approaching) a destination designated by the user when guiding the user along a route using a map screen on which location information of the user is mapped. As discussed above, when guiding the user along a route using a location-based service, the mobile device 101 determines whether the user has approached (or is approaching) the destination by determining whether the user is currently located near the destination.

When the user is determined to have approached the destination, the mobile device 101 activates a visual notification function associated with the destination in operation S220.

Destination information providing systems according to example embodiments may omit a portion of constituent elements or may further include additional constituent elements based on the detailed description of example embodiments of destination information providing methods described above with reference to FIGS. 1 through 7. Also, at least two constituent elements may be combined and operation orders or methods between constituent elements may be modified.

As described above, according to example embodiments, quality and/or satisfaction of a route guide service may be enhanced by more accurately notifying a user of a destination using information associated with the destination when the user arrives near the destination using a location-based service.

It will be apparent to those skilled in the art that various modifications and variation can be made in the example embodiments without departing from the spirit or scope of example embodiments. Thus, it is intended that the example embodiments cover the modifications and variations of this invention provided they come within the scope of the appended claims and their equivalents.

What is claimed is:

1. A method of providing destination information to a user through a location-based service, the method comprising:
   determining whether the user is approaching a destination along a guided route for the user based on mapped location information for the user, the destination being designated by the user and being within a building or other structure, the guided route being a travel route traversed by the user from a starting location to the destination; and
   activating a visual notification function associated with the destination after and in response to completion of the guided route for the user from the starting location to the destination along the guided route, wherein
      the completion of the guided route for the user is determined based at least partially on indoor positioning information for the user, and
      the visual notification function includes at least an indoor view screen in which an actual indoor view of the destination is displayed.

2. The method of claim 1, wherein the travel route is traversed by the user at least one of by walking, using a vehicle, using public transportation, and using a bicycle.

3. The method of claim 1, wherein the destination is an intermediate destination along the guided route.

4. The method of claim 1, further comprising:
   displaying, on a street view screen, an actual street view around a current location of the user;
   highlighting an object corresponding to the destination on the street view screen; and
   displaying the highlighted object on the street view screen.

5. The method of claim 4, wherein the highlighting the object comprises:
   highlighting the object corresponding to the destination on the street view screen using a color or figure such that the highlighted object is distinguished from other objects on the street view screen.

6. The method of claim 4, wherein the highlighting the object comprises:
   processing an edge of the object corresponding to the destination to be bold on the street view screen.

7. The method of claim 4, wherein the object corresponds to one of the building or other structure, a location within a building complex, a street, a sidewalk, and a trail.

8. The method of claim 1, further comprising:
   displaying, on a street view screen, an actual street view around a current location of the user; and
   displaying, on the street view screen, an instruction indicator on an object corresponding to the destination.

9. The method of claim 1, further comprising:
   displaying, on a street view screen, an actual street view around a current location of the user; and
   displaying, on the street view screen, at least one of text describing the destination and an instruction indicator on an object corresponding to the destination.

10. The method of claim 1, wherein the activating the visual notification function associated with the destination comprises:
    displaying an enlarged photo of the destination.

11. The method of claim 1, wherein the activating the visual notification function associated with the destination comprises:
    displaying at least one of an actual photo of the destination and a three-dimensional (3D) map, the 3D map being generated using a vector rendering method.

12. A system for providing destination information to a user through a location-based service, the system comprising:
    a processor configured to execute computer-readable instructions that, when executed, cause the processor to
       determine whether the user is approaching a destination along a guided route for the user based on mapped location information for the user, the destination being designated by the user and being within a building or other structure, the guided route being a travel route traversed by the user from a starting location to the destination; and
       activate a visual notification function associated with the destination after and in response to completion of the guided route for the user from the starting location to the destination along the guided route; wherein
          the completion of the guided route for the user is determined based at least partially on indoor positioning information for the user, and
          the visual notification function includes at least an indoor view screen in which an actual indoor view of the destination is displayed.

13. The system of claim 12, wherein the travel route is traversed by the user at least one of by walking, using a vehicle, using public transportation, and using a bicycle.

14. The system of claim 12, wherein the destination is an intermediate destination along the guided route.

15. The system of claim 12, wherein the processor is further configured to execute computer-readable instructions to,
    display, on a street view screen, an actual street view around a current location of the user,
    highlight an object corresponding to the destination on the street view screen; and
    display the highlighted object on the street view screen.

16. The system of claim 12, wherein the processor is further configured to execute computer-readable instructions to cause the system to display an enlarged photo of the destination.

17. The system of claim 12, wherein the processor is further configured to execute computer-readable instructions to cause the system to display at least one of an actual photo of the destination and a three-dimensional (3D) map, the 3D map being generated using a vector rendering method.

18. A non-transitory computer-readable medium storing instructions to control a computer or processor-based system to perform a method for providing destination information to a user through a location-based service, the method comprising:
    determining whether the user is approaching a destination along a guided route for the user based on mapped location information for the user, the destination being designated by the user and being within a building or other structure, the guided route being a travel route traversed by the user from a starting location to the destination; and
    activating a visual notification function associated with the destination after and in response to completion of the guided route for the user from the starting location to the destination along the guided route, wherein
       the completion of the guided route for the user is determined based at least partially on indoor positioning information for the user, and the visual notification function includes at least an indoor view screen in which an actual indoor view of the destination is displayed.

19. A file distribution system for distributing a file of an application installed at a user terminal to provide destination information for the user terminal through a location-based service, the file distribution system comprising:
  a file transmitter configured to transmit the file in response to a request from the user terminal; and
  wherein the application includes,
    a first module configured to control the user terminal to determine whether the user is approaching a destination along a guided route for the user based on mapped location information for the user, the destination being designated by the user and being within a building or other structure, the guided route being a travel route traversed by the user from a starting location to the destination, and
    a second module configured to control the user terminal to activate a visual notification function associated with the destination after and in response to completion of the guided route for the user from the starting location to the destination along the guided route, wherein
      the completion of the guided route for the user is determined based at least partially on indoor positioning information for the user, and
      the visual notification function includes at least an indoor view screen in which an actual indoor view of the destination is displayed.

* * * * *